US008894263B2

United States Patent
Yeom et al.

(10) Patent No.: US 8,894,263 B2
(45) Date of Patent: Nov. 25, 2014

(54) OPTICAL PLATE, DISPLAY APPARATUS HAVING THE SAME, AND METHOD OF MANUFACTURING THE OPTICAL PLATE

(75) Inventors: Dong-Yeol Yeom, Cheonan-si (KR); Yongkyu Kang, Asan-si (KR); Seunghwan Chung, Asan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 323 days.

(21) Appl. No.: 13/224,541

(22) Filed: Sep. 2, 2011

(65) Prior Publication Data

US 2012/0257412 A1 Oct. 11, 2012

(30) Foreign Application Priority Data

Apr. 11, 2011 (KR) .................. 10-2011-0033483

(51) Int. Cl.
| F21V 7/04 | (2006.01) |
| B05D 5/06 | (2006.01) |
| G02B 5/04 | (2006.01) |
| G02F 1/1335 | (2006.01) |
| G02B 5/02 | (2006.01) |
| G02B 1/10 | (2006.01) |
| F21V 8/00 | (2006.01) |

(52) U.S. Cl.
CPC ............... *B05D 5/06* (2013.01); *G02B 6/0065* (2013.01); *G02B 5/045* (2013.01); *G02F 1/133606* (2013.01); *G02B 5/0231* (2013.01); *G02B 1/10* (2013.01); *G02B 6/0038* (2013.01); *G02B 5/0221* (2013.01); *G02B 6/0053* (2013.01); *G02B 5/0278* (2013.01); *G02B 5/0268* (2013.01)
USPC .......... 362/607; 362/97.3; 362/246; 362/268; 362/326; 362/331; 362/339

(58) Field of Classification Search
USPC ............... 362/97.1–97.3, 235, 244, 246, 268, 362/311.01–311.03, 317, 326, 331, 333, 362/339
See application file for complete search history.

(56) References Cited

U.S. PATENT DOCUMENTS

| 6,870,674 B2 | 3/2005 | Ookawa et al. |
| 7,665,876 B2 | 2/2010 | Taya et al. |

(Continued)

FOREIGN PATENT DOCUMENTS

JP 2006-343624 12/2006

OTHER PUBLICATIONS

Jae Hyun Park et al., "P-110: Multi Refractive collimation Film (MRF) for NBPC BLU System", LG Philips LCD, SID International Symposium (2008).

(Continued)

*Primary Examiner* — Nimeshkumar Patel
*Assistant Examiner* — Jose M Diaz
(74) *Attorney, Agent, or Firm* — F. Chau & Associates, LLC

(57) ABSTRACT

A display apparatus includes a light source, a display panel and an optical plate between the light source and the display panel. The optical plate includes a supporting sheet, a first, a second and a third optical layer. The first optical layer is disposed on a bottom surface of the supporting sheet and has a plurality of first protruding portions on a bottom surface of the first optical layer and has a first refractive index. The second optical layer is disposed on the bottom surface of the first optical layer and covers the first protruding portions. The second optical layer has a second refractive index larger than the first refractive index. The third optical layer is disposed on a top surface of the supporting sheet and has a plurality of second protruding portions on a top surface and has a third refractive index smaller than the second refractive index.

31 Claims, 8 Drawing Sheets

(56) References Cited

U.S. PATENT DOCUMENTS

| | | |
|---|---|---|
| 7,804,650 B2 | 9/2010 | Yamada |
| 7,991,257 B1 * | 8/2011 | Coleman ........................ 385/129 |
| 2006/0152931 A1 * | 7/2006 | Holman ........................ 362/297 |
| 2008/0094845 A1 * | 4/2008 | Kusano et al. ................ 362/339 |
| 2008/0205066 A1 * | 8/2008 | Ohta et al. .................... 362/311 |
| 2009/0122225 A1 * | 5/2009 | Park ................................ 349/61 |
| 2009/0180191 A1 * | 7/2009 | Yamada ........................ 359/625 |
| 2011/0051248 A1 * | 3/2011 | Chi et al. ...................... 359/599 |
| 2011/0205756 A1 * | 8/2011 | Kim et al. ..................... 362/607 |
| 2012/0002440 A1 * | 1/2012 | Lin et al. ...................... 362/607 |

OTHER PUBLICATIONS

Presentation Information of UB Right Ltd., "MR610 Engineering sample data", Sep. 17, 2010.

\* cited by examiner

OPTICAL PLATE, DISPLAY APPARATUS HAVING THE SAME, AND METHOD OF MANUFACTURING THE OPTICAL PLATE

CROSS-REFERENCE TO RELATED APPLICATION

This application claims priority under 35 U.S.C. §119 to Korean Patent Application No. 10-2011-0033483 filed on Apr. 11, 2011, the contents of which are herein incorporated by reference in their entirety.

BACKGROUND

1. Technical Field

The present invention relates to an optical plate, a display apparatus having the same and a method of manufacturing the optical plate, more particularly, an optical plate with improved brightness, a display apparatus having such an optical plate and a method of manufacturing the optical plate with improved brightness.

2. Discussion of the Related Art

A liquid crystal display (LCD) is a thin display apparatus having a liquid crystal panel; however, since the liquid crystal panel is not self-emissive, the liquid crystal display requires a light source. For this purpose, the liquid crystal display includes a back light assembly as the light source supplying light to the liquid crystal panel.

The back light assembly includes a light source for emitting light, and an optical member. The light emitted from the light source passes through the optical member. In certain assemblies, the optical member may enhance the light emitted from the light source, thereby increasing brightness of the light provided to the liquid crystal panel.

Recently, liquid crystal display units have been developed that are thinner, and require less power for optimal operation. New liquid crystal displays that have lower manufacturing costs and improved efficiency are continually being pursued. To meet this need, a back light assembly, which requires fewer light sources, and yet provides sufficient brightness, is provided by embodiments of the present invention.

SUMMARY OF THE INVENTION

The present invention still further provides a method of manufacturing the optical plate having improved brightness.

According to one embodiment, an optical plate of the present invention includes a supporting sheet and three optical layers. The first optical layer is disposed on a bottom surface of the supporting sheet and has a plurality of first protruding portions on its bottom surface. The second optical layer is disposed on the bottom surface of the first optical layer and covers the first protruding portions. The second optical layer is characterized as having a refractive index that is higher than the refractive index of the first optical layer. The third optical layer is disposed on the top surface of the supporting sheet. The third optical layer has a plurality of second protruding portions on its top surface and is characterized as having a refractive index that is lower than the refractive index of the second optical layer. The refractive indices of the first optical layer and the third optical layer are each in a range from about 1.43 to about 1.54. The refractive index of the second optical layer is in a range from about 1.58 to about 1.62.

A display panel according to one embodiment of the present invention includes a display panel, a light source for radiating light, a light guide plate disposed between the display panel and the light source for guiding the light, and an optical plate disposed between the light guide plate and the display panel for focusing the light.

In one embodiment, the optical plate reduces or prevents abrasion of the protruding portions (such as prism shaped protrusions) in the optical layers by bonding the prism sheets with an adhesive. Alternatively, in another embodiment, the adhesive can be omitted and thus avoid possible defects within the adhesive layer, such as bubbles or other defects in the adhesive.

In another embodiment the invention provides an optical plate providing transmitted light having enhanced brightness. Also provided is a display apparatus that includes an optical plate according to the above description that is capable of providing an image having improved brightness.

Further provided is a simplified method of manufacturing an optical plate having the above-described structure and characteristics, reducing manufacturing costs and process time. The method includes providing a supporting sheet having a first and a second surface; forming a first optical layer on a first surface of the supporting sheet, the first optical layer having a plurality of first protruding portions and having a first refractive index, the first protruding portions being disposed on the bottom surface of the first optical layer; forming a second optical layer on the first optical layer and contacting the first protruding portions, the second optical layer having a second refractive index, wherein the second refractive index is higher than the first refractive index; and forming a third optical layer on a second surface of the supporting sheet, the third optical layer having a plurality of second protruding portions and having a third refractive index, the third refractive index being lower than the second refractive index.

BRIEF DESCRIPTION OF THE DRAWINGS

The above and other embodiments of the present invention described in detail below will become readily apparent by reference to the following detailed description when considered in conjunction with the accompanying drawings.

FIG. 9C is a side view of a supporting sheet (SPS) having a top surface (SF1) and a bottom surface (SF2); the first optical layer (OPL1) is disposed on surface, SF1 and having been rolled according to the method step of the invention show in FIG. 9B has protruding portions over its surface. Another optical layer (OPL2) is disposed on and in contact with the surface of OPL1 having the protruding portions PR1, and formed to fill the indentations between the protrusions PR1. the.

DETAILED DESCRIPTION

Figure 1:
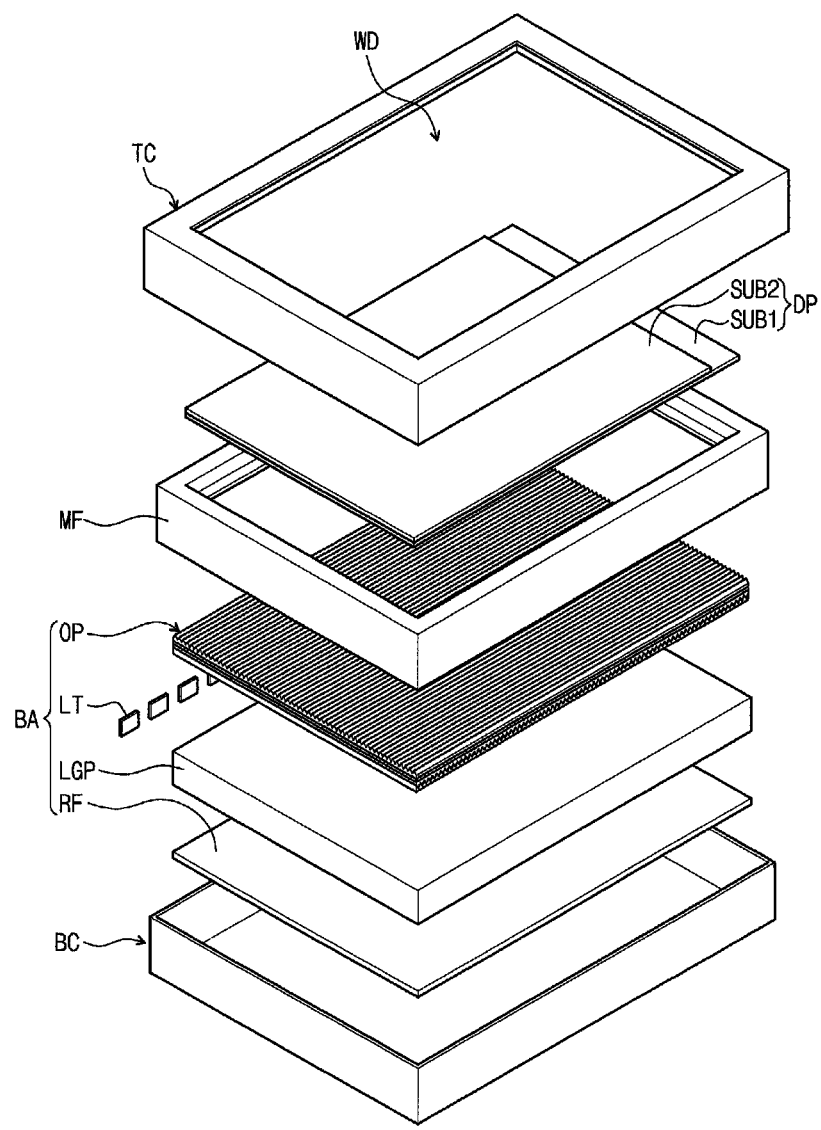
FIG. 1 is an exploded perspective view showing a display apparatus according to an exemplary embodiment of the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to", "directly coupled to" or "contacting" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. It will be understood that the designation of a layer as a first layer is for identification only, and unless explicitly stated, is not intended to convey any order or position in the assembly or structure of which it is a component.

Spatially relative terms, such as "beneath", "below", "lower", "above", "upper" and the like, may be used herein for ease of description to describe the relationship of one element or feature to another element or feature. It should be understood that the spatially relative terms used to describe the invention are intended to convey relative positions only and can be re-oriented as a whole without changing the relative special positions disclosed. Thus the invention encompasses different orientations of the device in use or operation in addition to the orientation depicted in the figures. For example, if the device in the figures is turned over, elements described as "below" or "beneath" other elements or features would then be oriented "above" the other elements or features. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to convey both singular and plural instances and also single members of plural forms, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

The display apparatus shown in FIG. 1 includes a display panel DP, a mold frame MF, a back light assembly BA, a bottom chassis BC and a top chassis TC. The display panel DP displays an image. The display panel DP is a light receiving display panel. For, example, the display panel DP may be any suitable display panel, such as for instance, but without limitation, a liquid crystal display panel or an electrophoresis display panel. In the following exemplary embodiment, a liquid crystal display panel is described as an example.

in one embodiment, the display panel DP has a rectangular shape having a long side and a short side, and includes a first substrate SUB1 disposed on one surface and a second substrate SUB2 in proximity to the first substrate SUB1, with a liquid crystal layer (not shown) disposed between the first and second substrates SUB1 and SUB2. The liquid crystal layer includes liquid crystal molecules.

According to an embodiment of the present invention, the first substrate SUB1 may include a plurality of pixel electrodes (not shown) and a plurality of thin film transistors (not shown) electrically connected to the pixel electrodes in one-to-one correspondence. Each of thin film transistors switches a driving signal applied to its corresponding pixel electrode. The second substrate SUB2 may include a common electrode (not shown) that forms an electric field with the pixel electrodes. The liquid crystal molecules are driven by the electric field formed through the pixel electrodes and the common electrode, such that the amount of light transmitted through the liquid crystal layer is controlled, thereby displaying the image.

The mold frame MF is provided along an edge of the display panel DP and is disposed under the edge of the display panel DP, so that the mold frame MF supports the display panel DP. The mold frame MF has substantially a rectangular loop-like shape. As shown in FIG. 1, the mold frame MF may be provided in a single, but it should not be limited thereto. That is, there may be more than one mold frame MF.

The back light assembly BA provides the display panel DP with a light. The back light assembly BA is disposed below the display panel DP. The back light assembly BA includes a light source LT emitting light, a light guide plate LGP guiding the light to the display panel DP, an optical plate OP for improving efficiency of the light, and reflection sheet RF for changing a proceeding direction of the light.

The light source LT provides the light guide plate LGP with the light. FIG. 1 shows a plurality of light emitting diodes as the light source LT. But it will be appreciated that the light source useful in the display panel of the present invention can be any suitable light source. For example, the light source LT can be one or more cold cathode fluorescence lamps, one or more external electrode fluorescent lamps, or one or more hot cathode fluorescence lamps.

In one embodiment of the display panel of the invention, the light guide plate LGP has a rectangular plat-like shape and is located below the display panel DP. The light guide plate LGP can be formed of any suitable transparent polymer resin, such as polycarbonate or polymethylmethacrylate. The two longest sides of the light guide plate LGP are disposed to be parallel to the longest sides of the display panel DP. The light guide plate LGP guides the light provided from the light source LT to the display panel DP. The light incident on the illuminated sides of the light guide plate LOP travels through the light guide plate and to the display panel DP through a top surface of the light guide plate LGP.

In one non-limiting embodiment, shown in FIG. 1, the light source LT is disposed on one of side surfaces of the light guide plate LGP, In another example, multiple light sources LT are provided and disposed on a plurality of the side surfaces of the light guide plate LGP.

The optical plate OP is disposed between the light guide plate LGP and the display panel DP. The optical plate OP controls the light transmitted from the light guide plate LGP. The optical plate OP is described below.

Optical sheets (not shown) can be disposed between the optical plate OP and the display panel DP; or between the optical plate OP and the light guide plate LOP. For example, a dual brightness enhancement film (DBEF, not shown) can be disposed between the optical plate OP and the display panel DP, and a diffusion sheet diffusing the light (not shown) can be disposed between the optical plate OP and the light guide plate LGP.

The reflection sheet RF is disposed below the light guide plate LGP and on the bottom chassis BC. The reflection sheet RF reflects the light, which does not travel to the display panel and is leaked from light guide plate LGP, to the display panel DP. That is, the reflection sheet RF reflects the light which does not travel to the display panel and is leaked from light guide plate LOP. As a result, the amount of light provided to the display panel DP is increased, enhancing image brightness.

The top chassis TC is disposed on the display panel DP. The top chassis TC supports a edge of a front surface of the display panel DP, and may cover the side surfaces of the mold frame MF or the side surfaces of the bottom chassis. The top chassis TC has a window WD exposing a display region of the display panel DP. The bottom chassis BC is disposed below the back light assembly BA to accept elements of the back light assembly BA.

In the embodiment of the display apparatus of the invention described above, the light emitted from the light source LT is provided to the display panel DP via the light guide plate LGP and the optical plate OP. The display panel DP transmits the light or shields the light, thereby displaying an image to the front direction.

Figure 2:
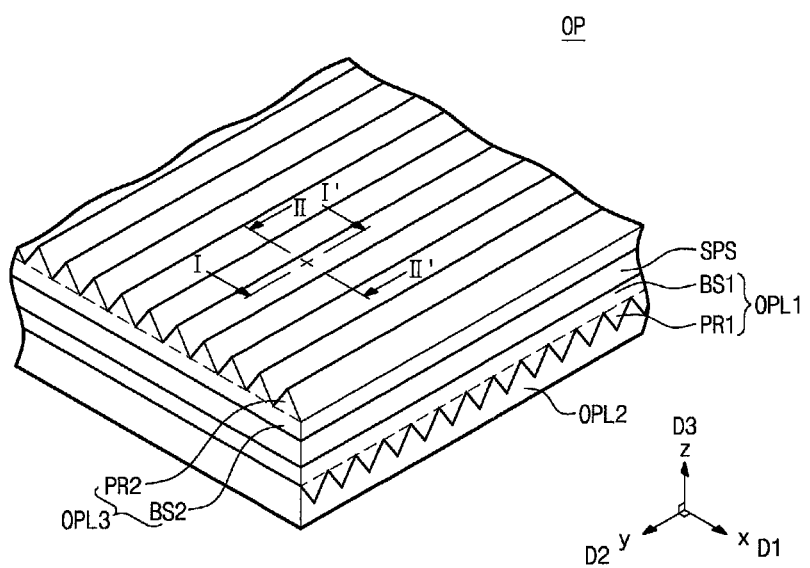
FIG. 2 is a perspective view showing an optical plate according to a first exemplary embodiment of the invention depicted in FIG. 1.
Figure 3:
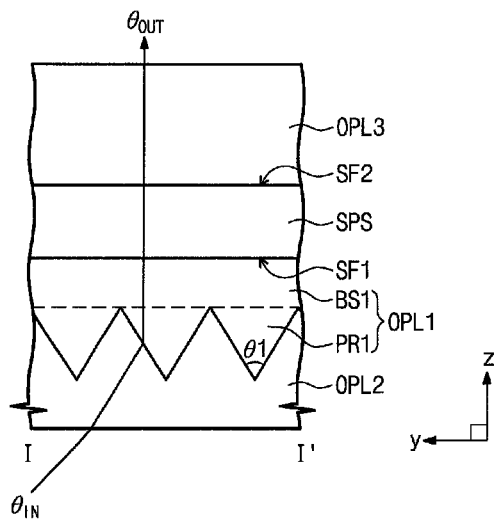
FIG. 3 is a cross-sectional view along the line I-I' shown in FIG. 2.
Figure 4:
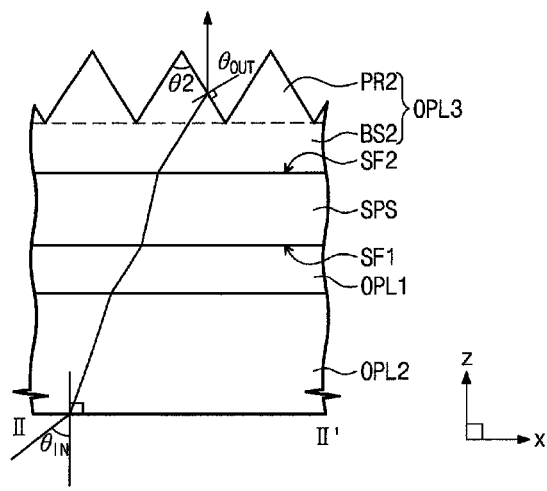
FIG. 4 is a cross-sectional view along the line II-II' shown in FIG. 2.

FIG. 2 is a perspective view showing an optical plate according to one exemplary embodiment of the present invention, FIG. 3 shows a cross-sectional view taken along a line I-I' of FIG. 2, and FIG. 4 shows a cross-sectional view taken along a line II-II' of FIG. 2.

Referring to FIGS. 1 to 4, the optical plate OP according to this embodiment of the invention has a rectangular shape. The x-axis is parallel to one pair of parallel sides of the optical plate OP, and the y-axis is perpendicular to the x-axis and parallel to the other pair of sides of the optical plate OP, and the third axis, the z-axis is perpendicular to the x-axis and y-axis. An extending direction of the x-axis defines a first direction D1, an extending direction of the y-axis defines a second direction D2 and an extending direction of the z-axis defines a third direction D3. FIGS. 3 and 4 show paths of the light transmitted through the optical plate OP when the transmission angle is 0 (zero) degrees. FIG. 3 shows a path of the light in y-z plane, and FIG. 4 shows a path of the light in x-z plane.

The optical plate OP includes a supporting sheet SPS, a first optical layer OPL1, a second optical layer OPL2 and a third optical layer OPL3. The first and second optical layers OPL1 and OPL2 are sequentially stacked on one surface of the supporting sheet SPS, and the third optical layer OPL3 is disposed on another surface of the supporting sheet SPS.

The supporting sheet SPS supports the first optical layer OPL1 and the second optical layer OPL2, and the supporting sheet SPS has substantially a rectangular plate-like shape having a pair of long sides and a pair of short sides. The supporting sheet SPS includes a first surface SF1 and a second surface SF2 being opposite to each other and having the largest area. The light emitted from the light source LT passes through the light guide plate LGT to be incident on the first surface SF1. The first surface SF1 may be a bottom surface of the supporting sheet SPS. The light is transmitted through the second surface SF2. The second surface SF2 may be a top surface of the supporting sheet SPS. For the purpose of ease and convenience in explanation, the first surface SF1 faces downward and the second surface SF2 faces upward in FIGS. 3 and 4.

The supporting sheet SPS can be formed of any suitable transparent polymer resin well known in the art, such as, but not limited to polyethyleneterephthalate (PET) having a refractive index of 1.57.

The first optical layer OPL1 is disposed on the first surface SF1. The first optical layer OPL1 includes a first base BS1 and a plurality of first protruding portions PR1 on the first base BS1. The first protruding portions PR1 protrude from a bottom surface of the first base BS1. The first base BS1 and the first protruding portions PR1 are formed as a single unit structure.

Each of the first protruding portions PR1 is extended in the first direction D1. In one embodiment, the first direction D1 is perpendicular to the surface of the supporting sheet SPS. However, the extending direction of the protruding portions PR1 are not limited. In other embodiments, the extending direction of the first protruding portions PR1 can be changed dependent upon the location of the light source LT. For example, the extending direction of the first protruding portions PR1 can be oblique to the surface the supporting sheet SPS rather than perpendicular to it as described above.

Each of the first protruding portions PR1 may be formed as a prism shape having a first vertex angle θ1. In a particular embodiment, the cross section of each of the first protruding portions PR1, which is perpendicular to the first surface SF1 and the first direction D1, has a triangular shape, and a vertex angle of the triangle shape corresponds to the first vertex angle θ1. The first vertex θ1 can be any angle in the range from about 60 degrees to about 80 degrees.

The first optical layer OPL1 has a refractive index in the range from about 1.43 to about 1.54. The first optical layer OPL1 can be formed of any suitable transparent polymer resin having a refractive index in this range. For example, the first optical layer OPL1 can be formed of a methyl triazine bis-ethyl acrylate of the following chemical formula 1 or bisphenol-A ethylmethacrylate of the following chemical formula 2.

[Chemical formula 1]

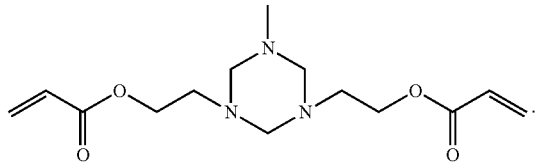

(5-methyl-1,3,5-triazinane-1,3-diyl)bis(ethane-2,1-diyl) diacrylate

[Chemical formula 2]

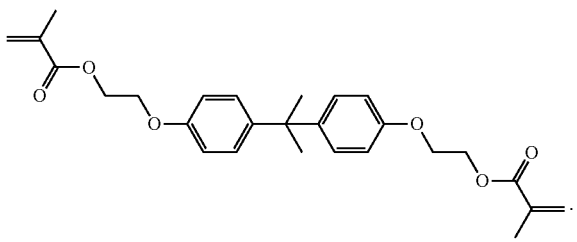

((propane-2,2-diylbis(4,1-phenylene))bis(oxy))bis(ethane-2,1-diyl) diacrylate

The light incident on the bottom surface of the first optical layer OPL1 includes a component (i.e. y-axis component of the light) perpendicular to the extending direction of the first protruding portions PR1, and the first optical layer OPL1 focuses the component (i.e. y-axis component of the light) to proceed in a direction (i.e. z-axis direction) perpendicular to the first surface SF1.

The second optical layer OPL2 is disposed on the bottom surface of the first optical layer OPL1 to cover the first protruding portions PR1. The second optical layer OPL2 fills the indented regions formed between the adjacent first protruding portions, such that no space remains between the first and second optical layers OPL1 and OPL2. As a result, the second optical layer OPL2 protects the first protruding portions PR1 of the first optical layer OPL1.

The second optical layer OPL2 has a refractive index in a range from about 1.58 to about 1.62. The second optical layer OPL2 can be formed of any suitable transparent polymer resin having a refractive index in this range. For example, in one embodiment, but without limitation, the second optical layer OPL2 can be formed of a fluorene acrylate of the following chemical formula 3.

[Chemical formula 3]

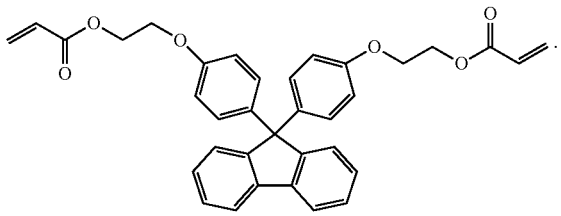

(((9H-fluorene-9,9-diyl)bis(4,1-phenylene))bis(oxy))bis(ethane-2,1-diyl) diacrylate The third optical layer OPL3 is disposed on the second surface SF2 of the supporting sheet SPS. The third optical layer OPL3 include a second base BS2 and a plurality of second protruding portions PR2 formed on the second base BS2. The second protruding portions PR2 protrude from a top surface of the second base BS2. The second protruding portions PR2 and the second base BS2 are formed as one unit.

A line joining the vertices of each of the adjacent protruding portions PR2 extends in a direction that intersects with a line joining the vertices of the adjacent protruding portions PR1. A angle between the lines of the first protruding portion PR1 and the second protruding portion PR2 can be 90 degrees, but it is not limited thereto. For example, the intersecting angle of the first protruding portion PR1 and the second protruding portion PR2 can be more than 0 degrees or less than 90 degrees. In one embodiment of the present invention, the first protruding portion PR1 has a shape extended in direction D1, and the second protruding portions PR2 has a shape extended in the second direction D2 crossing the first direction D1, wherein the first direction D2 is parallel with either the long side or the short side of the rectangular supporting sheet SPS.

Each of the second protruding portions PR2 can be formed as a prism-shape having a second vertex angle $\theta 2$. In one embodiment a cross section of each of the second protruding portions PR2, which are perpendicular to the first surface SF1 (and also to the second surface SF2) and the second direction D2, has a triangle shape, and a vertex angle of a protrusion of the triangle shape corresponding to the second vertex angle $\theta 2$. The second vertex $\theta 2$ can be any angle in a range from about 60 degrees to about 90 degrees.

The light incident on a bottom surface of the third optical layer OPL3 includes a component (i.e. x-axis component of the light) perpendicular to the extending direction of the second protruding portions PR2, and the third optical layer OPL3 focuses this component (i.e. x-axis component of the light) to proceed in a direction (i.e. z-axis direction) perpendicular to the first surface SF1.

The third optical layer OPL3 has a refractive index that is less than the second refractive index. The refractive index of OPL3 can be any value in a range from about 1.43 to about 1.54. According to one exemplary embodiment of the present invention, the refractive index of OPL3 is the same as the refractive index of OPL1. The optical layer OPL3 can be formed of any suitable material different from that of the first optical layer OPL1, but having a refractive index being the same as the first refractive index. Alternatively, the third optical layer OPL3 can be formed of the same material as OPL1, so that the refractive indices of OPL1 and OPL3 are identical. The third optical layer OPL3 can be formed of any transparent polymer resin. For example, the third optical layer OPL3 can be formed of a triazine acrylate of the above chemical formula 1, or a bisphenol-A diethylmethacrylate of chemical formula 2. According to another embodiment of the present invention, the optical layer OPL3 can be formed of a material different from that of the first optical layer OPL1 and the refractive index of the optical layer OPL3 can be different from that of optical layer OPL1.

In FIG. 3, the light is incident on the bottom surface of the optical plate OP and shines through the optical plate OP, and the light is then emitted from the top surface of the optical plate OP. In particular, the light is incident on the bottom surface of the second optical layer OPL2, and then the light sequentially passes through the first optical layer OPL1, the supporting sheet SPS and the third optical layer OP3 to be emitted from the top surface of the third optical layer OP3. The light is refracted at interfaces of the second optical layer OPL2, the first optical layer OPL1, the supporting sheet SPS and the third optical layer OP3, thereafter, a path of the light is finally redirected to be parallel with the z-axis. In particular, the light is refracted at the interface between an air and the second optical layer OPL2 and at the interface between the second optical layer OPL2 and the first optical layer by relative refractive index differences, so that the light finally proceed to the z-axis direction.

Referring to FIG. 3, when the first vertex angle is θ1 and an incident angle of the light being incident on the bottom surface of the second optical layer OPL2 is $\theta_{in}$, an exit angle $\theta_{out}$ is represented by the following equation 1. In the following equation 1, $n_1$ is the first refractive index and $n_2$ is the second refractive index.

$$\theta_{out} = \sin^{-1}\left[n_1 \times \sin\left\{90° - \frac{\theta_1}{2} + \sin^{-1}\left\{n_2 \times \sin\left(90° - \frac{\theta_1}{2} - \sin^{-1}\left(\frac{\sin\theta_{in}}{n_2}\right)\right)\right\}\right\}\right] \quad \text{[Equation 1]}$$

In FIG. 4, the light is incident on the bottom surface of the optical plate OP and is transmitted through the optical plate OP, and is then the light emitted from the top surface of the optical plate OP. In particular, the light is incident on the bottom surface of the second optical layer OPL2, and then sequentially passes through the first optical layer OPL1, the supporting sheet SPS and the third optical layer OP3 to be emitted from the top surface of the third optical layer OP3. The light is refracted at interfaces of the second optical layer OPL2, the first optical layer OPL1, the supporting sheet SPS and the third optical layer OP3, thereafter, the path of the light is finally redirected by refraction to be parallel with the z-axis. For example, the light is refracted at the interface between an air and the second optical layer OPL2, at the interface between the second optical layer OPL2 and the first optical layer OPL1, at the interface between the first optical layer OPL1 and the supporting sheet SPS, at the interface between the supporting sheet SPS and the third optical layer OPL3, and at the interface between the third optical layer OPL3 and the air. The light is refracted by relative refractive index differences. The light is then finally transmitted in the z-axis direction.

In FIG. 4, when the second vertex angle is θ2 and an incident angle of the light being incident on the bottom surface of the second optical layer OPL2 is $\theta_{in}$, an exit angle $\theta_{out}$ is represented by the following equation 2.

$$\theta_{out} = \sin^{-1}\left[n_1 \times \sin\left\{90° - \frac{\theta_1}{2} - \sin^{-1}\left(\frac{\sin\theta_{in}}{n_1}\right)\right\}\right] \quad \text{[Equation 2]}$$

The following Table 1 shows simulation values of the first vertex angles θ1 and the second vertex angles θ2 using the incident angle $\theta_{in}$ of the light being incident on the optical plate OP shown in FIGS. 1 to 4. Also, the following table 1 shows simulation values of a first experimental example and a second experimental example when the exit angle $\theta_{out}$ is 0 degree. In the first experimental example of the following Table 1, each of the first and third refractive indexes of the first and third optical layers OPL1 and OPL3 was 1.43. And the second refractive index of the second optical layer OPL2 was 1.62. In the second experimental example of the following Table 1, each of the first and third refractive indexes of the first and third optical layers OPL1 and OPL3 was 1.53 and the second refractive index of the second optical layer OPL2 was 1.58.

TABLE 1

| | First | | Second | |
|---|---|---|---|---|
| Incident angle ($\Theta_{in}$, °) | First vertex angle ($\Theta$1, °) | Second vertex angle ($\Theta$2, °) | First vertex angle ($\Theta$1, °) | Second vertex angle ($\Theta$2, °) |
| 30 | 77 | 83 | 73 | 88 |
| 40 | 71 | 76 | 67 | 80 |
| 50 | 66 | 69 | 62 | 74 |
| 60 | 62 | 63 | 58 | 68 |

According to the first and second experimental examples, the exit angle $\theta_{out}$ is substantially 0 degrees, the first vertex angle θ1 is between about 60 degrees and about 80 degrees, and the second vertex angle θ2 is between about 60 degrees and about 90 degrees.

Figure 5:
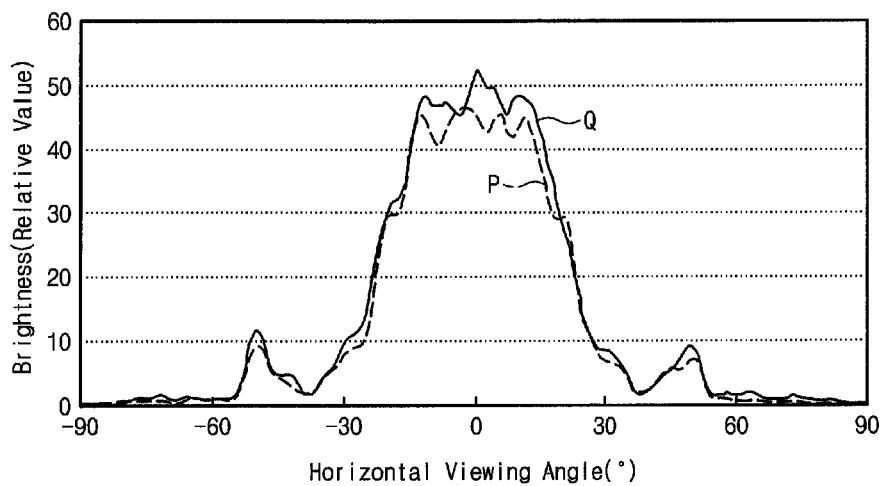
FIG. 5 is a simulation graph showing the variation in brightness of the light (P) transmitted through a conventional optical plate plotted against the horizontal viewing angle; and a similar plot of the variation in brightness of the light (Q) transmitted through the optical plate according to the embodiment of the invention shown in FIGS. 2-4.

FIG. 5 shows a simulation graph with a horizontal viewing angle of light transmitted through a conventional optical plate and a horizontal viewing angle of light transmitted through the optical plate according to the first experimental example. Line P represents the horizontal viewing angle of the conventional optical plate and line Q represents the horizontal viewing angle of the optical plate OP according to this particular experimental example of the present invention.

The conventional optical plate includes a first prism sheet having a plurality of prism-shapes extending in one direction, a second prism sheet having a plurality of prism-shapes extending in another direction perpendicular to the one direction, and an adhesion layer between the first and second prism sheets. Each of vertex angles of the prism-shapes of the first and second prism sheets in the conventional optical plate was 90 degrees and each of refractive indices of the first and second prism sheets was 1.47. In the optical plate OP according to the first exemplary embodiment of the present invention, the first vertex angle θ1 was 64 degrees, the second vertex angle θ2 was 72 degrees, the refractive index of the supporting sheet SPS was 1.57, each of the first and third refractive indexes of the first and third optical layers OPL1 and OPL3 was 1.47, and the second refractive index of the second optical layer OPL2 was 1.58.

Referring to FIG. 5, the horizontal viewing angle of the conventional optical plate was a range of about −30 degrees to about +30 degrees, also the horizontal viewing angle of the optical plate OP according to the first exemplary embodiment of the present invention was a range of about −30 degrees to about +30 degrees. However, a light focusing efficiency of the optical plate OP according to the first exemplary embodiment was higher than that of the conventional optical plate.

Figure 6:
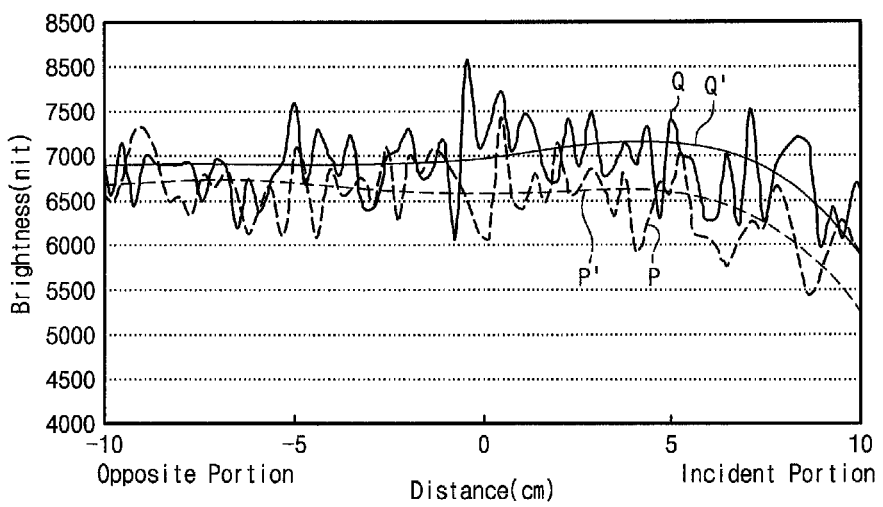
FIG. 6 is a simulation graph showing brightness of light transmitted through a conventional optical plate and brightness of light transmitted through the optical plate according to the embodiment of the invention shown in FIGS. 2-4.

FIG. 6 is a simulation graph showing brightness of light transmitted through a conventional optical plate and brightness of light transmitted through the optical plate according to the first exemplary embodiment of the present invention. In FIG. 6, line P represents brightness of the light transmitted through a conventional optical plate, and line Q represents brightness of the light transmitted through the optical plate OP according to the first experimental example. The line P' is a trend line showing mean values. The mean values in the line P' are mean values of measured values in the line P. Each of the mean values of the line P' is a mean value of five measured values adjacent to each other in the line P. The line Q' is a trend line showing mean values. The mean value in the line Q' are mean values of measured values in the line Q. Each of the mean values in the Q' is a mean value of five measured values adjacent to each other in the line Q.

In the simulation represented in FIG. 6, each of the conventional optical plate and the optical plate OP according to the first exemplary embodiment was configured to have a width of 20 centimeters (cm) and a length of 20 centimeters (cm). A light source was configured to be disposed at a side of each of the conventional optical plate and the optical plate OP. An incident portion in FIG. 6 is a portion of each of the conventional optical plate and the optical plate OP that is close to the light source, and an opposite portion in FIG. 6 is a portion of each of the conventional optical plate and the optical plate OP that is close to the light source that is far from the light source. The opposite portion is opposite to the incident portion. A position of 0 (zero) centimeters in FIG. 6 corresponds to a center between the incident portion and the opposite portion. As described with reference to FIG. 6, the brightness of the light transmitted through the optical plate OP according to the first exemplary embodiment may be substantially higher than that of the light transmitted the conventional optical plate from the incident portion to the opposite portion. In FIG. 6, an average brightness of the light transmitted through the conventional optical plate was 6523.9 nit (candelas/m$^2$), and an average brightness of the light transmitted through the optical plate OP according to the first exemplary embodiment of the present invention was 6778.3 nit (candelas/m$^2$). As a result, the average brightness of the light transmitted through the optical plate OP according to the first exemplary embodiment was about 104% of the average brightness of the light transmitted through the conventional optical plate.

As described above, the brightness of the optical plate OP in this exemplary embodiment of the present invention is higher than that of the conventional optical plate. Also, a light focusing effect of the optical plate OP according to the first exemplary embodiment can be substantially the same as that of a conventional optical plate having a plurality of prism sheets being stacked due to a light focusing effect by the first and second protruding portions PR1 and PR2 of the first and third optical layers OPL1 and OPL3 as well as a light focusing effect by refractive index differences between the optical layers OPL1, OPL2 and OPL 3 and the supporting sheet SPS of the optical plate OP. Additionally, when a plurality of prism sheets of the conventional optical plate are stacked, a top surface of a lower prism sheet and a top surface of an upper prism sheets may wear. However, according to the first exemplary embodiment of the present invention, the optical plate OP including the optical layers OPL1, OPL2 and OPL3 and the supporting sheet SPS can reduce or prevent abrasion. Furthermore, an adhesive may be disposed between the prism sheets of the conventional optical. Alternatively, the adhesive layer may be omitted and thus avoid any possible defect (e.g. an air bubble in an adhesive or mixing of an alien material) that may be present in or formed by the adhesive. Thus, according to another exemplary embodiment of the present invention, the optical plate OP can be formed without an adhesive to avoid such defects.

Figure 7:
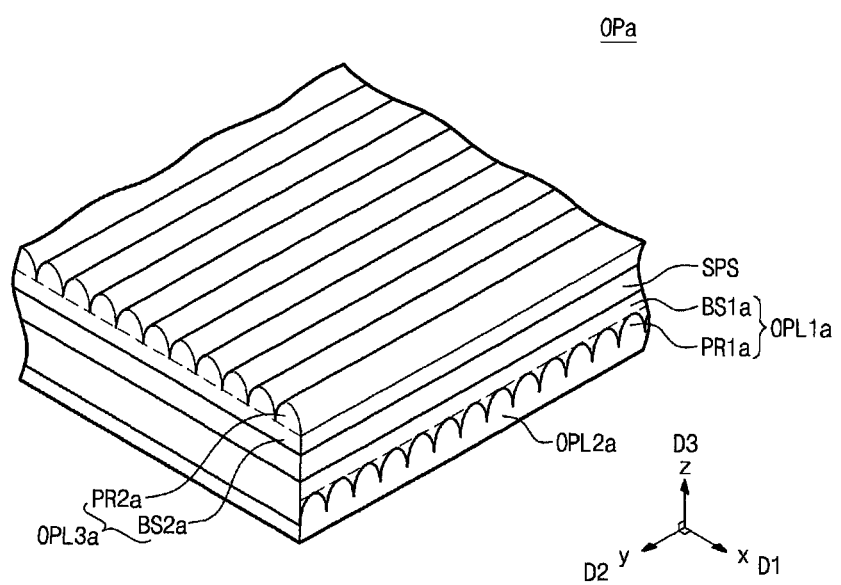
FIG. 7 is a perspective view showing an optical plate according to another embodiment of the invention, wherein the cross-sections of the protruding portions of the optical layers are segments od a circle or of an ellipse.

FIG. 7 is a perspective view showing an optical plate according to a second exemplary embodiment of the present invention. An optical plate OPa according to the present exemplary embodiment has the similar structure and function as those of the optical plate shown in FIG. 2, and thus the same reference numerals refer to the same elements.

In FIG. 7, the optical plate OPa includes a supporting sheet SPS, a first optical layer OPL1a and a second optical layer OPL2a sequentially stacked on a bottom surface of the supporting sheet SPR, and a third optical layer OPL3a disposed on a top surface of the supporting sheet.

The first optical layer OPL1a is disposed on the first surface SF1 of the supporting sheet SPS. The first optical layer OPL1a consists of a first base BS1a and a plurality of first protruding portions PR1a formed on the first base BS1a. Each of the first protruding portions PR1a has a shape extended in a first direction D1. Each of indented regions between the first protruding portions PR1a adjacent to each other has a cross section being perpendicular to the first surface SF1 and the first direction D1 and having a shape of a portion of an ellipse The second optical layer OPL2a is disposed on a bottom surface of the first optical layer OPL1a. The second optical layer OPL2a covers the first protruding portions without a space between the first optical layer OPL1a and the second optical layer OPL2a.

The third optical layer OPL3a is disposed on the second surface SF2 of the supporting sheet SPS. The third optical layer OPL3a consists of a second base BS2a and a plurality of second protruding portions PR2 formed on the second base BS2a. Each of the second protruding portions PR2 has a shape extended in a second direction D2 crossing the first direction D1. A cross section of each of the second protruding portions, which is perpendicular to the first surface SF1 (or the second surface SF2) and the second direction D2, has a shape corresponding to a portion of an ellipse. The first, second and third optical layers OPL1a, OPL2a and OPL3 may be formed of the same materials as the first, second and third optical layers OPL1, OPL2 and OPL3 respectively in FIG. 2.

According to one exemplary embodiment the first protruding portions PR1 or PR1a and the second protruding portions PR2 or PR2a have a shape corresponding to a prism-shape or a portion of an ellipse, but it should not be limited thereto. For example, the cross section of the first protruding portion PR1 or PR1a, which is perpendicular to the first surface SF1 (or the second surface SF2) and the first direction D1, may have a shape corresponding to a portion of a polygon or a portion of a circle, but it should not be limited thereto. The cross section of the second protruding portion PR2 or PR2a, which is perpendicular to the first surface SF1 (or the second surface SF2) and the second direction D2, may have a shape corresponding to a portion of a polygon or a portion of a circle, but it should not be limited thereto. Furthermore, a shape of the first protruding portion PR1 (or PR1a) may be different from that of the second protruding portion PR2 (or PR2a). For example, the cross section of the first protruding portion PR1 (or PR1a) may have a shape of a triangle, and the cross section of the second protruding portion PR2 (or PR2a) may have a shape corresponding to a portion of an ellipse.

In still another embodiment, a top surface of the first optical layer OPL1 can have a surface unevenness. Also, a bottom surface of the second optical layer OPL2 can have an unevenness. The unevenness may disperse a portion of the light transmitted through the optical plate OP thereby redirecting the light having a substantially uniform intensity to an upward direction. A surface roughness of the unevenness may have a range of about 0.1 micrometers (µm) to about 50 micrometers (µm).

Figure 8:
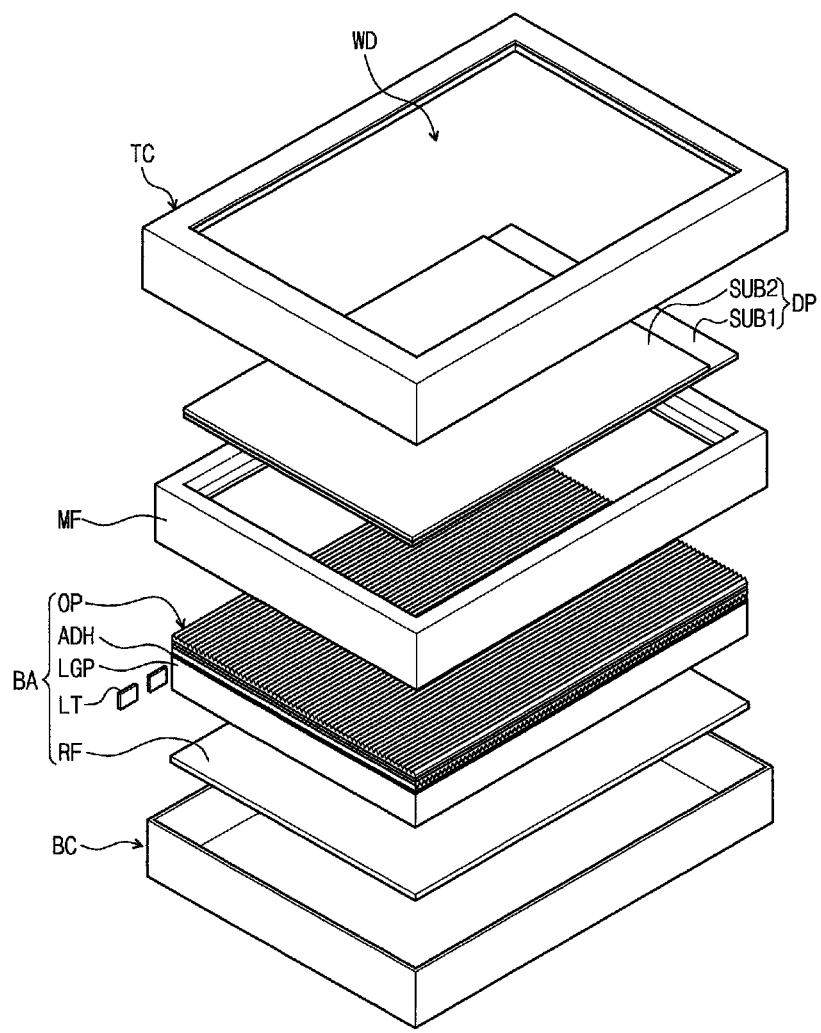
FIG. 8 is an exploded perspective view showing a display apparatus according to another embodiment of the invention, having an adhesive layer (ADH) disposed between the optical plate and the light guide plate (LGP)

FIG. 8 is an exploded perspective view showing a display apparatus according to another exemplary embodiment of the present invention. The display apparatus in FIG. 8 has the optical plate OP according to the first exemplary embodiment. Therefore, the display apparatus according to another exemplary embodiment in FIG. 8 will be described with reference to FIGS. 8 and 2, and the same reference numerals are assigned to the same element.

As shown in FIGS. 2 and 8, the display apparatus can include a display panel DP, a mold frame MF, a back light assembly BA, a bottom chassis BC and a top chassis TC. The display panel DP displays an image, and the display panel DP has a rectangular plate-like shape having a long side and a short side. The display panel DP includes a first substrate SUB1, a second substrate SUB2 opposite to the first substrate SUB1, and a liquid crystal layer (not shown) disposed between the first and second substrates SUB1 and SUB2. The mold frame MF is provided along an edge of the display panel DP and is disposed under the edge of the display panel DP, so that the mold frame MF supports the display panel DP.

The back light assembly BA provides the display panel DP with light and is disposed below the display panel DP. The back light assembly BA includes a light source LT emitting light, a light guide plate LGP guiding the light to the display panel DP, an optical plate OP for improving efficiency of the light, and reflection sheet RF for changing a proceeding direction of the light.

The light source LT provides the light guide plate LGP with the light. The light guide plate LGP has a rectangular plat-like shape and is located below the display panel DP. Two widest surfaces among surfaces of the light guide plate LGP are disposed to parallel with the display panel DP. The light guide plate LGP guides the light provided from the light source LT to the display panel DP. The light incident on the inside of the light guide plate LGP travels to the display panel DP through a top surface of the light guide plate LGP.

The optical plate OP is disposed between the light guide plate LGP and the display panel DP. An adhesion layer ADH is disposed between the optical plate OP and the light guide plate LGP to bond the optical plate OP to a top surface of the light guide plate LOP. In particular, the adhesion layer ADH is disposed between a bottom surface of the second optical layer OPL2 and the top surface of the light guide plate LGP to bond the bottom surface of the second optical layer OPL2 to the top surface of the light guide plate LOP. The reflection sheet RF is disposed on the bottom chassis BC to reflect the light. The top chassis TC is disposed over the display panel DP. The bottom chassis BC is disposed below the back light assembly BA to accept elements of the back light assembly BA.

The display apparatus having the above structure prevents abrasion or scratching caused by the movement of the optical plate or optical sheet of a conventional display apparatus that is not fixed.

In FIG. 8, an additional adhesion layer may be disposed between the optical plate OP and a bottom surface of the display panel DP to bond the optical plate OP to the top surface of the display panel DP. In more details, the additional adhesion layer may be disposed between the third optical layer OPL3 of the optical plate DP and the first substrate SUB1 of the display panel DP to bond the top surface of the third optical layer OPL3 of the optical plate OP to the first substrate SUB 1 of the display panel DP. As a result, unlike a conventional display apparatus, movement of the second protruding portions PR2 of the third optical layer OPL3 is prevented by the additional adhesion layer. Therefore, abrasion of the second protruding portions PR2 is prevented, thereby improving uniformity or brightness of the light transmitted through the display panel DP.

FIGS. 9A to 9D are cross-sectional views showing a method of manufacturing the optical plate according to the first exemplary embodiment of the present invention. For the purposed of ease and convenience in explanation, the method of manufacturing the optical plate OP according to the first exemplary embodiment in FIG. 2 will be described as an example.

The optical plate OP according to the first exemplary embodiment may be manufactured by extruding processes.

Figure 9A:
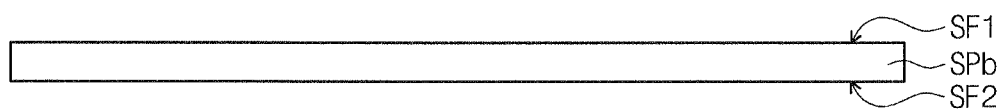
FIG. 9A is a side view of a supporting sheet (SPb) having a top surface (SF1) and a bottom surface (SF2).

For manufacturing the optical plate using the extruding processes, as shown in FIG. 9A, a supporting sheet SPS is prepared. The supporting sheet SPS may be formed by molding a polymer resin (e.g. polyethyleneterephthalate) into a rectangular plate and hardening the molded polymer resin.

Figure 9B:
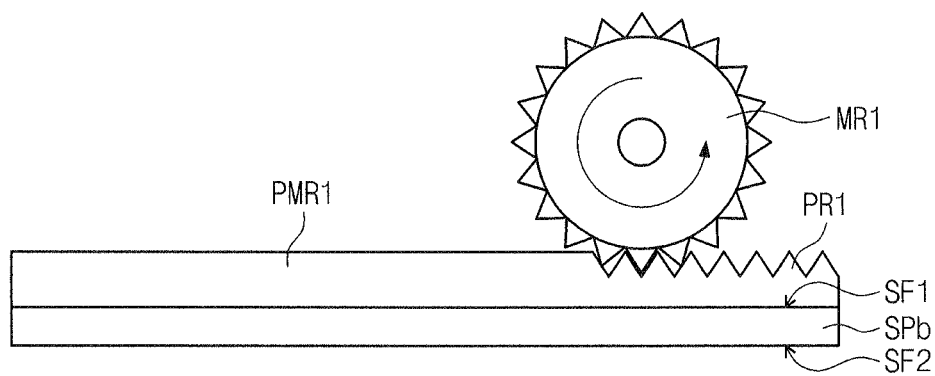
FIG. 9B is a cross-sectional view of the supporting sheet (SPb) having an polymer resin layer (PMR1) disposed on the top surface, during the manufacturing method of the present invention. A first master roller (MR1) having a plurality of teeth of a triangular cross section is rolled along the polymer resin layer (PMR1) to form indentations with intervening protrusions (PR1).

Next, as shown in FIG. 9B, a first polymer resin PMR1, which is non-hardened and has a first refractive index, is formed on the first surface of the supporting sheet SPS. First protruding portions PR1 are formed on the first polymer resin PMR1 using a first master roll MR1. The reverse pattern of the first protruding portions PR1 is formed on a surface of the first master roll MR1 for transferring the first protruding portions PR1. The first master roll MR1 is in the shape of a cylindrical roller. A surface of the cylindrical roller can be scored using a diamond bit to form the reverse pattern of the first protruding portions PR1 on the surface of the cylindrical roller. The first master roller MR1 is in contact and presses against the surface of the first polymer resin PMR1 and rotates in one direction simultaneously. This causes the reverse pattern to be transferred to the surface of the first polymer resin PMR1 to form the first protruding portions PR1. Then, the first polymer resin PMR1 having the first protruding portions PR1 is hardened to form a first optical layer OPL1. That is, the first optical layer OPL1 is formed by a first extruding process and rolling process using the first master roll.

Figure 9C:
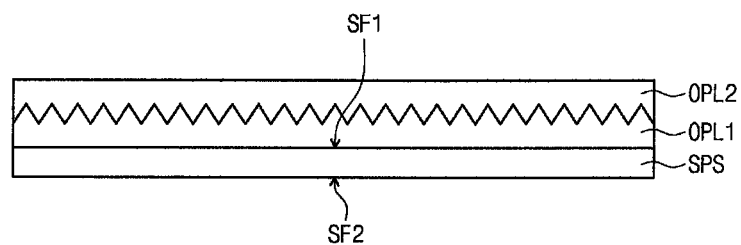

Next, as shown in FIG. 9C, a second polymer resin, which in non-hardened and has a second refractive index higher than the first refractive index, is formed on the first optical layer OPL1. And then the second polymer resin is hardened to form a second optical layer OPL2.

Figure 9D:
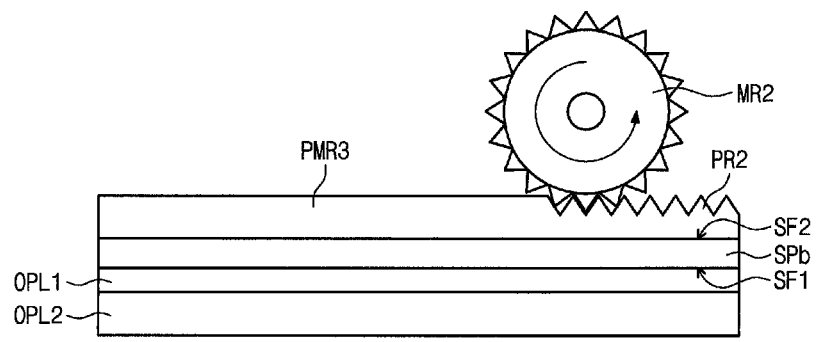
FIG. 9D is a cross-sectional view of the supporting sheet (SPb) having an optical layer (OPL1) disposed on and in direct contact with one surface (SF1) and a second optical layer (OPL2) disposed on and in direct contact with the opposite surface of OPL1. A polymer resin layer (PMR3) is disposed on the top surface of the supporting sheet (SPb). during the manufacturing method of the present invention. A second master roller (MR2) having a plurality of teeth of a triangular cross section is rolled along the polymer resin layer (PMR3) to form indentations with intervening protrusions (PR2).

Next, as shown in FIG. 9D, a third polymer resin PMR3, which is non-hardened and has a third refractive index, is formed on a second surface SF2 opposite to the first surface SF2 of the supporting sheet SPS. Then second protruding portions PR2 are formed on the third polymer resin PMR3 using a second master roll MR2. A reverse pattern of the second protruding portions PR2 is formed on a surface of the second master roll MR2 to transfer the second protruding portions PR2. The second master roll MR2 is in pressure contact with the surface of the third polymer resin PMR3 and simultaneously rotates in another direction different form the one direction. Therefore, the reverse pattern of the second master roll MR2 transferred to the surface of the third polymer resin PMR3 to form the second protruding portions PR2. And then the third polymer resin PMR3 having the second protruding portions PR2 is hardened to form the third optical layer OPL3 of FIG. 2. That is, the third optical layer OPL3 of FIG. 2 is formed by a second extruding process using the second master roll MR2. A shape of the reverse pattern of the first master roll MR1 may be the same as or different from that of the reverse pattern of the second master roll MR2.

As described above, the optical plates according to embodiments of the present invention can be manufactured by a simplified manufacturing process, thereby reducing the manufacturing cost and process time.

Although the exemplary embodiments of the present invention have been described, it should be understood that the present invention is not limited to these exemplary embodiments. Various changes and modifications can be made by one of ordinary skilled in the art within the spirit and scope of the present invention as hereinafter claimed.

What is claimed is:

1. An optical plate, comprising:
   a supporting sheet having a top surface and a bottom surface;
   a first optical layer disposed on a bottom surface of the supporting sheet, the first optical layer having a first refractive index and a top and a bottom surface, the bottom surface having a plurality of first protruding portions, wherein each of the first protruding portions has a first cross section perpendicular to the bottom surface of the first optical layer, the first cross section being a first portion of a triangular prism;

a second optical layer contacting the bottom surface of the first optical layer, covering the first protruding portions and filling indented regions formed between adjacent first protruding portions wherein no space remains between the first and second optical layers, the second optical layer having a second refractive index, wherein the second refractive index is higher than the first refractive index;

a third optical layer having a top and a bottom surface, the bottom surface contacting and covering the top surface of the supporting sheet, the third optical layer having a plurality of second protruding portions on its top surface and having a third refractive index, wherein the third refractive index is lower than the second refractive index and the third refractive index is the same as the first refractive index, wherein each of the second protruding portions has a second cross section perpendicular to the bottom surface of the third optical layer, the second cross section being a portion of a triangular prism; and wherein the first protruding portion of the triangular prism has a first vertex angle, the first vertex angle being in a range from about 75 degrees to about 80 degrees.

2. The optical plate of claim 1, wherein the first refractive index and the third refractive index are each in a range from about 1.43 to about 1.54.

3. The optical plate of claim 2, wherein the first optical layer comprises a transparent polymer resin.

4. The optical plate of claim 3, wherein the transparent polymer resin comprises triazine acrylate or bisphenol-A acrylate.

5. The optical plate of claim 2, wherein the first refractive index is different from the third refractive index.

6. The optical plate of claim 2, wherein the first refractive index is the same as the third refractive index.

7. The optical plate of claim 2, wherein the second refractive index is in a range from about 1.58 to about 1.62.

8. The optical plate of claim 7, wherein the second optical layer comprises a transparent polymer resin.

9. The optical plate of claim 8, wherein the transparent polymer resin comprises fluorene acrylate.

10. The optical plate of claim 7, wherein each of the first protruding portions has a cross section and a vertex, the vertices being arranged in contiguous groups, wherein each group of contiguous vertices of first protruding portions describes a line extending in a first direction, and each of the second protruding portions has a cross section and a vertex, the vertices being arranged in contiguous groups, wherein each group of contiguous vertices of second protruding portions describes a line extending in a second direction; and the first direction and the second direction intersect.

11. The optical plate of claim 1, wherein the second protruding portions of the triangular prisms have a second vertex angle, the second vertex angle being in a range from about 75 degrees to about 90 degrees.

12. The optical plate of claim 10, wherein the optical plate has a rectangular shape having a long side and a short side, wherein the first direction is parallel to the long side or the short side of the rectangle, and the second direction is perpendicular to the first direction.

13. The optical plate of claim 10, wherein each cross section of the first protruding portions perpendicular to the bottom surface of the supporting sheet has a shape corresponding to a portion of a polygon, a portion of a circle or a portion of an ellipse, and wherein each cross section of the second protruding portions perpendicular to the top surface of the supporting sheet has a shape corresponding to a portion of a polygon, a portion of a circle or a portion of an ellipse.

14. The optical plate of claim 1, wherein each of the top surface of the first optical layer and the bottom surface of the second optical layer has an unevenness having a surface roughness in a range from about 0.1 micrometers to about 50 micrometers.

15. The optical plate of claim 1, wherein the supporting sheet comprises polyethyleneterephthalate (PET).

16. The optical plate of claim 15, wherein the supporting sheet consists essentially of polyethyleneterephthalate (PET).

17. The optical plate of claim 16, wherein the supporting sheet consists of polyethyleneterephthalate (PET).

18. A display apparatus, comprising:
a display panel having a top and a bottom surface;
a light source for radiating light;
a light guide plate a top surface and a bottom surface and being disposed between the display panel and the light source, and capable of guiding the light; and
an optical plate disposed between the light guide plate and the display panel capable of focusing the light,
wherein the optical plate comprises:
a supporting sheet having a top and a bottom surface;
a first optical layer having a first refractive index and contacting the bottom surface of the supporting sheet, the first optical layer having a plurality of first protruding portions, having an indented region disposed between each adjacent pair of first protruding portions, the first protruding portions contacting the bottom surface of the first optical layer, wherein each of the first protruding portions has a first cross section perpendicular to the bottom surface of the first optical layer, the first cross section being a first portion of a triangular prism;
a second optical layer having a top and a bottom surface and filling indented regions formed between adjacent first protruding portions wherein no space remains between the first and second optical layers the second optical layer having a second refractive index, wherein the second refractive index is higher than the first refractive index; and
a third optical layer having a top and a bottom surface, the third optical layer contacting the top surface of the supporting sheet and having a plurality of second protruding portions on the top surface and having a third refractive index; wherein the third refractive index is lower than the second refractive index, and the third refractive index is the same as the first refractive index,
wherein each of the second protruding portions has a second cross section perpendicular to the bottom surface of the third optical layer, the second cross section being a portion of a triangular prism; and
wherein the first protruding portion of the triangular prism has a first vertex angle, the first vertex angle being in a range from about 75 degrees to about 80 degrees.

19. The display apparatus of claim 18, wherein each of the first refractive index and the third refractive index is in a range from about 1.43 to about 1.54, and the second refractive index is in a range from about 1.58 to about 1.62.

20. The display apparatus of claim 19, further comprising: a diffusion sheet between the optical plate and the light guide plate capable of diffusing the light.

21. The display apparatus of claim 18, further comprising: an adhesion layer disposed between a bottom surface of the second optical layer and a top surface of the light guide plate, the adhesion layer bonding the bottom surface of the second optical layer to the top surface of the light guide plate.

22. The display apparatus of claim 18, further comprising: an adhesion layer disposed between the top surface of the third optical layer and the bottom surface of the display panel to bond the top surface of the third optical layer to the bottom surface of the display panel.

23. An optical plate, comprising:
a supporting sheet having a top surface and a bottom surface;
a first optical layer comprising a transparent polymer resin disposed on the bottom surface of the supporting sheet, the first optical layer having a top and a bottom surface, the bottom surface having a plurality of first protruding portions, wherein each of the first protruding portions has a first cross section perpendicular to the bottom surface of the first optical layer, the first cross section being a first portion of a triangular prism; the first optical layer having a first refractive index in a range from about 1.43 to about 1.54;
a second optical layer contacting the bottom surface of the first optical layer and covering the first protruding portions having and filling indented regions formed between adjacent first protruding portions wherein no space remains between the first and second optical layers, the second optical layer having a second refractive index, wherein the second refractive index is higher than the first refractive index and in a range from about 1.58 to about 1.62; and
a third optical layer having a top and a bottom surface, the bottom surface contacting and covering the top surface of the supporting sheet, the third optical layer having a plurality of second protruding portions on its top surface and having a third refractive index, wherein the third refractive index is lower than the second refractive index and the third refractive index is the same as the first refractive index,
wherein each of the second protruding portions has a second cross section perpendicular to the bottom surface of the third optical layer, the second cross section being a portion of a triangular prism,
wherein each of the top surface of the first optical layer and the bottom surface of the second optical layer has an unevenness having a surface roughness in a range of about 0.1 micrometers to about 50 micrometers; and
wherein the first protruding portion of the triangular prism has a first vertex angle, the first vertex angle being in a range from about 75 degrees to about 80 degrees.

24. The optical plate of claim 23, wherein the supporting sheet comprises polyethyleneterephthalate (PET); the first optical layer comprises triazine acrylate or bisphenol-A acrylate; and the second optical layer comprises fluorene acrylate.

25. A display apparatus, comprising:
a display panel having a top surface and a bottom surface;
a light source for radiating light;
a light guide plate having a top surface and a bottom surface and being disposed between the display panel and the light source, and capable of guiding the light; and
an optical plate disposed between the light guide plate and the display panel capable of focusing the light,
wherein the optical plate comprises:
a supporting sheet having a top surface and a bottom surface;
a first optical layer comprising a transparent polymer resin disposed on the bottom surface of the supporting sheet, the first optical layer having a top and a bottom surface, the bottom surface having a plurality of first protruding portions, wherein each of the first protruding portions has a first cross section perpendicular to the bottom surface of the first optical layer, the first cross section being a first portion of a triangular prism; the first optical layer having a first refractive index in a range from about 1.43 to about 1.54;
a second optical layer contacting the bottom surface of the first optical layer, covering the first protruding portions having and filling indented regions formed between adjacent first protruding portions wherein no space remains between the first and second optical layers, the second optical layer having a second refractive index, wherein the second refractive index is higher than the first refractive index and in a range from about 1.58 to about 1.62; and
a third optical layer having a top and a bottom surface, the bottom surface contacting and covering the top surface of the supporting sheet, the third optical layer having a plurality of second protruding portions on its top surface and having a third refractive index, wherein the third refractive index is lower than the second refractive index and the third refractive index is the same as the first refractive index,
wherein each of the second protruding portions has a second cross section perpendicular to the bottom surface of the third optical layer, the second cross section being a portion of a triangular prism, and
wherein the first protruding portion of the triangular prism has a first vertex angle, the first vertex angle being in a range from about 75 degrees to about 80 degrees.

26. The display apparatus of claim 25, wherein the supporting sheet comprises polyethyleneterephthalate (PET); the first optical layer comprises triazine acrylate or bisphenol-A acrylate; and the second optical layer comprises fluorene acrylate.

27. An optical plate, comprising:
a supporting sheet having a top surface and a bottom surface;
a first optical layer disposed on a bottom surface of the supporting sheet, the first optical layer having a first refractive index and a top and a bottom surface, the bottom surface having a plurality of first protruding portions, wherein each of the first protruding portions has a first cross section perpendicular to the bottom surface of the first optical layer, the first cross section being a first portion of a triangular prism;
a second optical layer contacting the bottom surface of the first optical layer, covering the first protruding portions having and filling indented regions formed between adjacent first protruding portions wherein no space remains between the first and second optical layers, the second optical layer having a second refractive index, wherein the second refractive index is higher than the first refractive index;
a third optical layer having a top and a bottom surface, the bottom surface contacting and covering the top surface of the supporting sheet, the third optical layer having a plurality of second protruding portions on its top surface and having a third refractive index, wherein the third refractive index is lower than the second refractive index and the third refractive index is the same as the first refractive index; and wherein the second protruding portion of the triangular prism has a second vertex angle, the second vertex angle being in a range from about 75 degrees to about 90 degrees.

28. The optical plate of claim 27, wherein the second optical layer comprises a transparent polymer resin.

29. The optical plate of claim 28, wherein the transparent polymer resin comprises fluorene acrylate.

30. The optical plate of claim 29, wherein each of the first protruding portions has a cross section and a vertex, the vertices being arranged in contiguous groups, wherein each group of contiguous vertices of first protruding portions describes a line extending in a first direction, and each of the second protruding portions has a cross section and a vertex, the vertices being arranged in contiguous groups, wherein each group of contiguous vertices of second protruding portions describes a line extending in a second direction; and the first direction and the second direction intersect.

31. The optical plate of claim 30, wherein each cross section of the first protruding portions perpendicular to the bottom surface of the supporting sheet has a shape corresponding to a portion of a polygon, a portion of a circle or a portion of an ellipse, and wherein each cross section of the second protruding portions perpendicular to the top surface of the supporting sheet has a shape corresponding to a portion of a polygon, a portion of a circle or a portion of an ellipse.

* * * * *